Jan. 27, 1931.  P. Y. BORODIN  1,790,459
THRASHING MACHINE
Filed Feb. 17, 1930
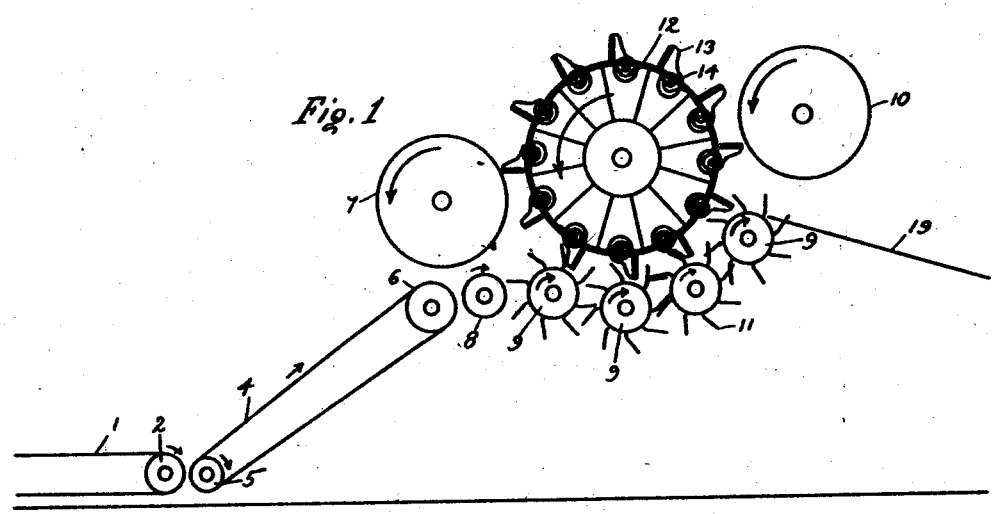
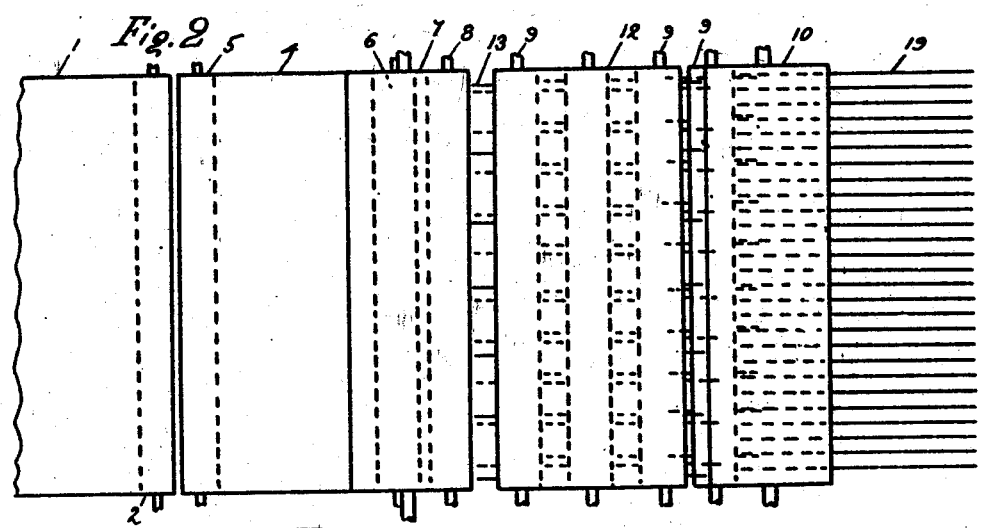
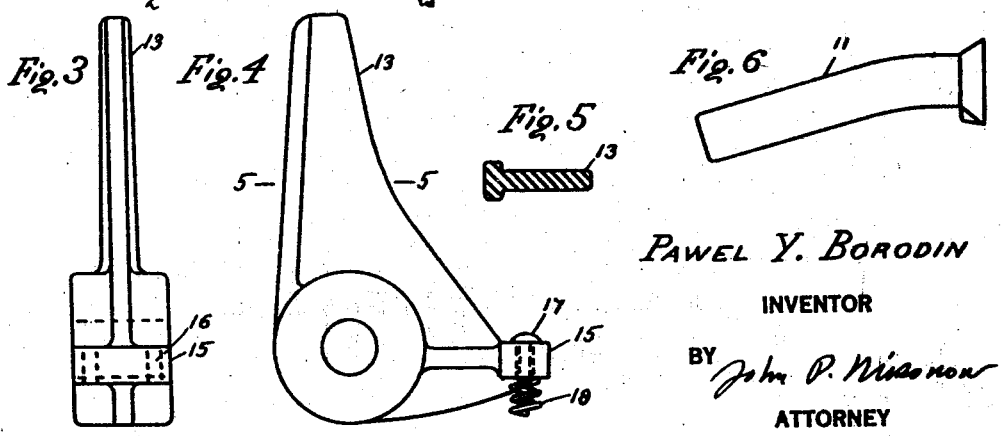
PAWEL Y. BORODIN
INVENTOR
BY *John P. Nissonow*
ATTORNEY Patented Jan. 27, 1931

1,790,459

UNITED STATES PATENT OFFICE

PAWEL Y. BORODIN, OF MOSCOW, UNION OF SOCIALIST SOVIET REPUBLICS

THRASHING MACHINE

Application filed February 17, 1930, Serial No. 429,036, and in the Union of Socialist Soviet Republics March 2, 1929.

My invention relates to thrashing machines and has a particular reference to machines for thrashing grain and similar cultures.

There are two principal types of thrashing machines: one, peg mill type, employing drums with pegs, and another, with beater drums. The first type operates by striking or hammering the ears and stalks, and the second type produces mainly rubbing action. Both of these types are very inefficient, as a large amount of power is spent not on the useful work of removing grain from the ears, but on breaking the straw—in peg mills, or smashing and compressing it—in beater thrashers. Much lower power consumption would be required if the ears could have been separated from the straw for thrashing, and this procedure has been actually suggested in Germany in order to save the power consumption. This saving can be very considerable, as the actual tests have shown that while it takes about 10 kilograms to break (by pulling apart) a rye or wheat straw, the ear itself requires but 1½ kg. for tearing it apart.

In combined harvesting and thrashing machines or "combines", a large amount of power is wasted on account of the arrangement for turning the stalks, coming from the header, at right angle for delivery to the drum. This turning causes an irregular piling of stalks and their twisting, so that in such combines it is usually necessary to provide about three times as much power as in stationary thrashers.

In order to obviate these difficulties and to reduce the amount of power requirements, I devised a special arrangement with a beater drum containing hinged pegs operating in a concave formed of a series of rotating rolls with pegs. The pegs on the main beater are kept under tension by the action of the centrifugal force and can deflect when striking an object. The concave rolls serve to carry the straws, so that they remain unbroken, the grain being loosened under light and rapid hammering from the hinged pegs.

My invention is described more fully in the accompanying specification and drawing in which—

Fig. 1 is a diagrammatic elevation showing principal operating parts of my thrashing machine, Fig. 2 is a plan view of same, Fig. 3 is an end view of a drum peg, Fig. 4 is a side view of same, Fig. 5 is a sectional view taken on the line 5—5 (Fig. 4), and Fig. 6 is a side view of a fixed peg.

My thrashing machine consists of a belt conveyor 1 moving on rolls 2 (one of which is only shown). An elevator belt 4 is placed with its lower roll 5 next to the end roll 2. The upper roll 6 is placed under a rear beater drum 7 and next to a transfer roll 8. A series of spiked rolls 9 is placed between the rear beater drum 7 and the front beater drum 10. These rolls are provided with a plurality of rigid or fixed spikes or pegs 11 arranged in different planes, so that they do not interfere with each other when the rolls rotate.

The spike rolls form a concave deck for a central pegged drum 12. This drum rotates in the same direction as the beater drums and in the opposite direction to the lower rolls, 6, 8 and 9. It has a plurality of pegs 13 pivotally mounted on pins 14 so that they can freely swing. When the drum rotates the pegs take radial positions due to the action of the centrifugal force (Fig. 1). They have lugs 15 at the base with holes 16 for pins 17 serving as guides for springs 18. These springs can be used to adjust the resistance of the pegs to deflection when they meet with certain resistance, for instance, when striking a bundle of straw. The pegs are arranged on the periphery of the drum so that they pass between the spikes 11 without interference.

An inclined grate 19 is placed in front of the machine for the removal of thrashed straw, allowing the broken ears to fall through.

The operation of my machine is as follows.

The stalks or loosened sheaves are delivered by the conveyor 1 and then raised by the elevator 4, passing over the guiding roll 8 to the spiked rolls 9. The beater drum 7 regulates the thickness of the layer of stalks passing to the rolls 9. The stalks are carried in packs between the spikes or pegs 11 of each roll and deposited into the spaces between the spikes of the next roll.

The spiked rolls form a concave surface for the main thrashing drum 12 the pegs of which pass between the spikes 11. Due to the rapid rotation of the drum, the pegs stand out radially under tension by the centrifugal force which may be supplemented by the tension of the springs 18. These springs are not necessary, however, and can be omitted, depending on the working conditions.

The pegs 13 strike the stalks and the ears with sharp blows sufficient to break the ears and to dislodge the grain, but they do not tear or break the straw, being readily deflected by the stronger packs of such straw or stalks.

Due to this arrangement of deflecting pegs, the resistance to the rotation of the drums and rolls is comparatively small, so that the amount of power required for my thrashing machine is also small. The straw comes out in an unbroken and good condition, representing a good marketable product.

The thrashed straw is guided by the beater drum 10 on the grate deck 19 where smaller particles, pieces of ears etc., are separated by falling between the grates.

Another important advantage of my arrangement is, that the straws or loosened sheaves do not change their axial positions during the process from the time when they are received on the conveyor 1 until they are discharged from the deck 19. This arrangement helps to keep the packs of stalks properly aligned and saves the power for their movement.

The conveyor 1 is adapted to receive the stalks directly from the harvesting shears. The stalks are then laid crosswise, retaining this position until they are discharged.

My mechanism is especially suitable for combines, as it eliminates the necessity for a right angle turn which is required for such combined machines with ordinary construction of the thrashing mechanism. The elimination of such turn saves a large amount of power.

I claim as my invention:

1. In a thrashing machine, the combination with a thrashing drum, of a plurality of pegs pivotally supported on said drum, lugs on said pegs at an angle with the operating portions of said pegs, means to resiliently retain said pegs in an operating position, a plurality of spiked drums forming a concave under said thrashing drum, and means to deliver the stalks into the space between said spiked drums and said thrashing drum.

2. In a thrashing machine, the combination with a thrashing drum, of a plurality of pegs pivotally supported on said drum in longitudinal rows, spiked rolls under said thrashing drum forming a concave, means to deliver stalks under said thrashing drum, and a beater roll adapted to remove the thrashed stalks from said pegs at the point of delivery.

3. In a thrashing machine, the combination with a thrashing drum, of a plurality of pegs on said drum, spiked rolls under said drum forming a concave, means to deliver stalks into the space between said drum and said rolls, and means to remove the thrashed stalks from under said drum, said rolls being adapted to be rotated in a direction opposite to the rotation of said drum and at speeds adjusted in accordance with the nature of the stalks thrashed.

In testimony whereof I affix my signature.

PAWEL Y. BORODIN.